United States Patent [19]

Meyer et al.

[11] Patent Number: 5,519,097
[45] Date of Patent: May 21, 1996

[54] PROCESS FOR THE CONTINUOUS HYDROLYTIC POLYMERIZATION OF LAUROLACTAM

[75] Inventors: Klaus R. Meyer, Hattingen; Hubertus Ohm, Haltern, both of Germany

[73] Assignee: Huels Aktiengesellschaft, Marl, Germany

[21] Appl. No.: 377,623

[22] Filed: Jan. 25, 1995

[30] Foreign Application Priority Data

Feb. 18, 1994 [DE] Germany .......................... 44 05 161.1

[51] Int. Cl.⁶ ...................................... C08G 69/16
[52] U.S. Cl. ................ 526/64; 526/65; 528/323; 528/326
[58] Field of Search ................ 528/326, 323; 526/65, 64

[56] References Cited

U.S. PATENT DOCUMENTS

| | | | |
|---|---|---|---|
| 3,674,658 | 7/1972 | van Asperen et al. | 528/326 |
| 4,067,861 | 1/1978 | Biensan et al. | 528/326 |
| 4,077,946 | 3/1978 | Enenshtein et al. | 528/326 |
| 4,539,391 | 9/1985 | Pipper et al. | 528/323 |
| 4,837,297 | 6/1989 | Meyer et al. | 528/326 |
| 5,049,651 | 9/1991 | Heinz et al. | 528/480 |
| 5,283,315 | 2/1994 | Kawakami et al. | 528/326 |

FOREIGN PATENT DOCUMENTS

| | | |
|---|---|---|
| 0117495 | 9/1984 | European Pat. Off. |
| 0530592 | 3/1993 | European Pat. Off. |
| 235798 | 5/1986 | Germany |
| 49-021313 | 5/1974 | Japan |

*Primary Examiner*—James J. Seidleck
*Assistant Examiner*—P. Hampton-Hightower
*Attorney, Agent, or Firm*—Oblon, Spivak, McClelland, Maier & Neustadt

[57] ABSTRACT

The present invention provides an economical process for the continuous hydrolytic polymerization of laurolactam.

13 Claims, 1 Drawing Sheet

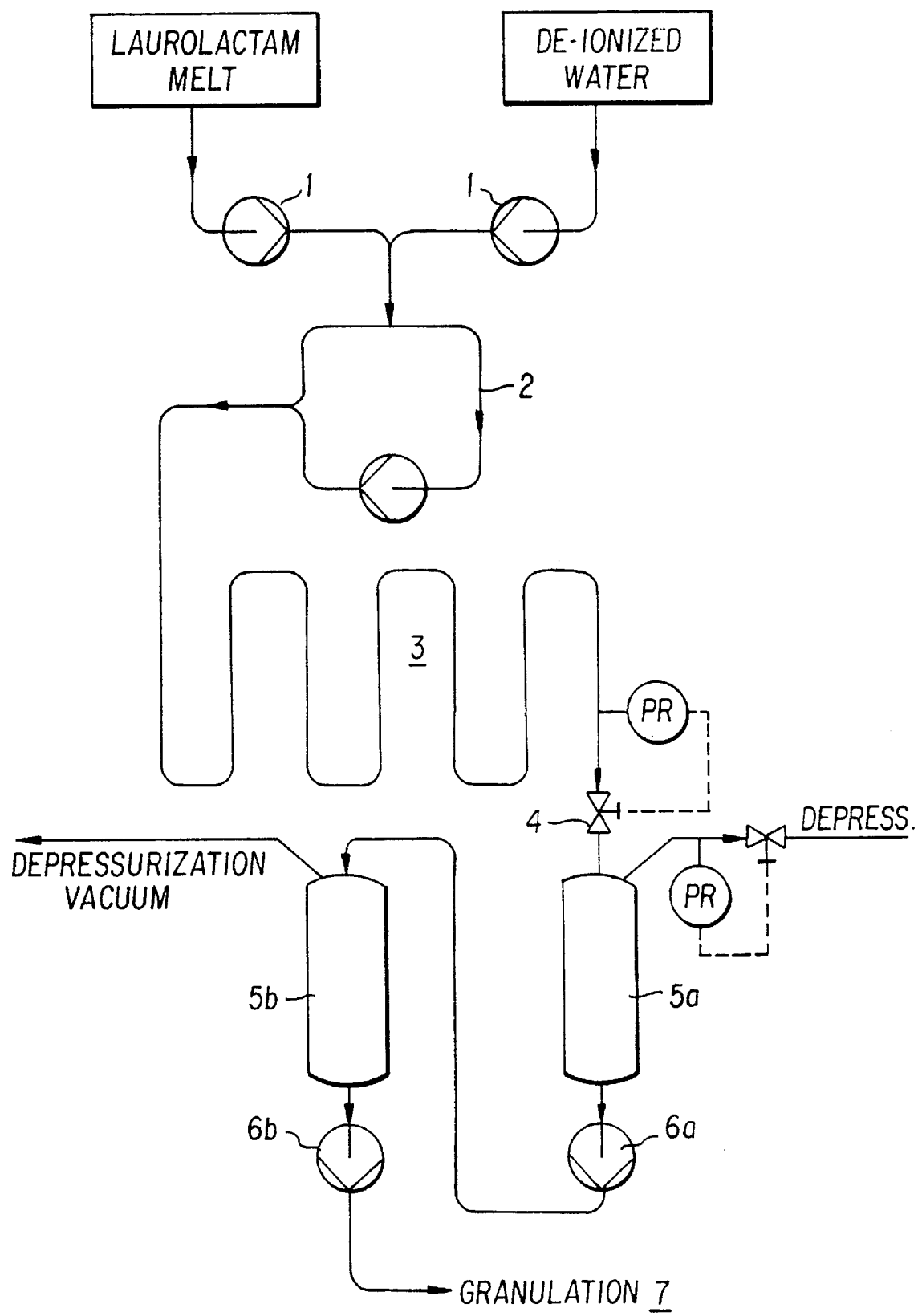

PROCESS FOR THE CONTINUOUS HYDROLYTIC POLYMERIZATION OF LAUROLACTAM

BACKGROUND OF THE INVENTION

1. Field of the Invention

The invention relates to a process for the continuous hydrolytic polymerization of laurolactam, in which hydrolytic cleavage is first used to prepare a prepolymer which is subsequently condensed to give a high-molecular-weight polyamide 12 product.

2. Discussion of the Background

The conventional method of preparing polyamide 12 from laurolactam involves a batchwise hydrolytic polymerization in a stirred reaction vessel, as is described in various patent applications (see, for example, U.S. Pat. Nos. 3,410832; 3,799,899 and 4,837,297). Unfortunately, this method possesses, inter alia, the following inherent disadvantages. First, on the one hand, a high water content is desirable, since water has strongly accelerating effect on the ring cleavage and thus on the prepolymerization. On the other hand, however, this acceleration gives rise to high steam pressures at the temperatures required for the reaction. Since the costs of large, stirred reaction vessels increase greatly with the permissible operating pressure, only relatively small amounts of water can be used, resulting in long reaction times. This leads to high manufacturing costs.

Second, the batchwise procedure results in only sequential utilization of individual equipment items, such as conveying facilities, discharge filters or granulators. These equipment items therefore have to be designed for throughputs which are much higher than the average throughput of the total plant, which leads to high costs.

Third, in the batchwise operation of pressure vessel plants, problems usually result from material which remains in the vessel when the latter is discharged. Prolonged residence times result in interfering secondary reactions of the polyamide 12 formed. Product residues in the reactor and in the lines can, for example, lead to gel-like impurities in the next batch.

The disadvantages of a batchwise mode of operation can be avoided by a continuous polymerization process.

For the polymerization of caprolactam to give polyamide 6, a continuous procedure has been the state of the art for some time, as described in, for example, H. Ludewig, Faserfor-schung Textiltechn. 2, 341–355 (1951). However, the processes described for caprolactam are, without exception, not applicable to laurolactam, since this material behaves completely differently from caprolactam in respect of the polymerization conditions required (water content, pressure, temperature, residence time).

U.S. Pat. No. 4,539,391 describes a process for the continuous polymerization of caprolactam, in which the lactam containing from 1 to 25% by weight of water is heated to a temperature of from 220° to 280° C. in a prepolymerization zone at a pressure of from 1 to 10 bar with simultaneous evaporation of the water over a residence time of from 1 to 10 minutes and is subsequently further polymerized in a polymerization zone with continuous removal of the steam. However, use of laurolactam in place of the lactams having from 7 to 12 ring members described in this document gives virtually no conversion.

There have hitherto been few developments specifically for the continuous hydrolytic polymerization of laurolactam. All the inventions published in this field have considerable disadvantages which greatly limit the economics or the product properties.

SU-A 12 08 044 necessitates the use of phosphoric acid as catalyst; the laurolactam conversion reaches only 99%. The remaining residual monomer content of 1% causes problems in processing and use of the product. Commercial use of these products would require a preceding, complicated removal of monomer. In addition, the use of such a strongly acid catalyst would have the disadvantage that the polylaurolactam thus prepared experiences increased hydrolytic degradation in its processing or in use at elevated temperature; in addition, the polymerization reactors and the processing machines are subjected to increased corrosion.

JP-A 60 041 647 covers only the region of very high temperatures and pressures as process parameters. However, under these conditions there is formation of gel particles and the color is impaired. Furthermore, only oligomers can be obtained at first, and the further polycondensation of these requires, e.g. as described in JP-A 61 166 833, complicated techniques and equipment items such as degassing screw machines.

The process described in JP-A 49 021 313 leads to reaction times which give no substantial advantages in comparison with non-continuous batch procedures (residence time a total of 13 hours). The procedure described leads to gelling of the product in the second reactor.

In U.S. Pat. No. 4,077,946, phosphoric acid has, according to the invention, to be present as catalyst; the depressurization process is carried out isothermally at great expense; furthermore, it has been found that the monomer removal described cannot be carried out in practice. U.S. Pat. No. 4,077,946 can be evaluated similarly.

U.S. Pat. No. 5,283,315 describes a continuous polymerization process in a complicated multi-component reactor which has to be kept under a temperature gradient. To prepare the finished polymer, a condensation facility with stirrers is required. The water contents given in the polymerization (from 1 to 10%) lie outside the values for a maximum space-time yield. The residence times required as a result for the prepolymerization of from 7 to 8 hours offer no advantage in comparison with the batchwise process.

SUMMARY OF THE INVENTION

It is therefore an object of the present invention to design an economical process which is as simple as possible in terms of apparatus. In addition, the process should not need a catalyst which would remain in the product at the end. The residual monomer content of the polymer obtained should correspond to that of the materials produced by batchwise methods or be even lower. Finally, the product should be very good quality in respect of color and gel content.

The present inventors have now achieved these and other objects with a process for the continuous hydrolytic polymerization of laurolactam, in which laurolactam and water are metered in via a pump, if desired passed through a reactor having largely ideal backmixing, subsequently reacted in a tube reactor to give a prepolymer which is then depressurized via a depressurization valve into a degassing apparatus from which it is discharged. In this process, a) the water content during the prepolymerization is from 7 to 20% by weight, b) the reaction temperature during the prepolymerization is from 280 to 320° C., and c) the depressurization valve is regulated in such a way that the working pressure is above the partial pressure of water vapor of the reaction mixture.

BRIEF DESCRIPTION OF THE DRAWINGS

FIG. 1 illustrates a continuous plant for the production of laurolactam.

DETAILED DESCRIPTION OF THE PREFERRED EMBODIMENTS

Laurolactam and water are preferably conveyed into the plant separately using a pump for each, with preference being given to using plunger pumps or piston diaphragm pumps.

In the optional subsequent reactor having largely ideal backmixing, the material streams are mixed and gently brought to the reaction temperature. For this purpose, use can be made of a suitably constructed stirred reactor, but preferably a loop reactor. The loop reactor contains a pump which circulates the fed-in material at preferably from 10 to 100 times the flow rate of the feed stream.

The mean residence time of the reactive material in the tube reactor is preferably from 0.5 to 6 hours, particularly preferably from 1.5 to 4 hours. To narrow the residence time distribution, the tube can be, if desired, completely or partially fitted with static mixer elements.

By means of regulation of the depressurization valve, a definite, freely selectable process pressure in the interior of the reactor can be maintained. The set pressure is selected in such a way that any formation of steam bubbles in the tube reactor is prevented.

The degassing apparatus used can be, for example, a screw machine, a thin-layer evaporator, a filmtruder or a flash vessel. Particularly suitable is a flash vessel whose internal pressure can be regulated by means of a regulating valve in the outgoing vapor line. Since the melt cools as a result of the evaporation process, it can be advantageous, depending on the water content used, to pass the fed-in melt after depressurization as a film over the internal wall of a heated vertical tube, so as to be able to supply a definite amount of heat. The mean residence time of the melt in the flash vessel is advantageously from 1 to 3 hours.

If desired, the plant can possess a further degassing stage which can comprise the same equipment items as the first degassing stage. Here too, a flash vessel can be used with particular advantage. In this case, it should be possible to apply reduced pressure. Another preferred possibility is the use of a degassing screw machine.

In the upstream reactor having a largely ideal backmixing or, if such a reactor is not installed, in the first sections of the tube reactor, the hydrolytic cleavage of the laurolactam commences. If, for example, a loop reactor is used, the cleavage process takes place there up to a conversion of from about 30 to 40%. In the further course of the reaction, the cleavage is completed up to a residual of laurolactam of about 0.3% by weight. At the same time, the polycondensation proceeds up to a number average degree of polymerization (depending on the water content) of from 10 to 20.

Once the major part of the water is removed in the first depressurization process, further condensation then commences. In the depressurization vessel, a definite level of polymer melt is preferably maintained, so that the prepolymer material has available sufficient residence time for the condensation into polyamide 12.

The product largely free of water in the degassing apparatus is preferably discharged via a pump, particularly preferably a gear pump.

In the second degassing apparatus present if desired, a further depressurization process is carried out. In this way, polyamide 12 of even higher molecular weights can be achieved. Additives such as, for example, molecular-weight regulators (such as lauric acid or dodecanoic acid), comonomers such as caprolactam, ω-aminoundecanoic acid or AH salt solution or, if desired, catalysts such as phosphoric acid or hypophosphorous acid can also be fed in at any desired point of the plant. It is also possible to feed in stabilizers.

The process of the invention has, in particular, the following advantages:

under the conditions indicated, a mean residence time in the tube reactor of from 0.5 to 6 hours (depending on the temperature selected and the water content) suffices for a virtually complete conversion. This leads to a high space-time yield.

The depressurization process proceeds in a controllable manner without problem, despite the extreme pressure drop.

Contrary to expert opinion hitherto, use of a flash vessel as depressurization apparatus results in no caking, not even after very long operating times, although the flash vessel has to possess neither a stirrer nor other means for cleaning the surfaces.

The polyamide 12 obtained has a low residual monomer content, excellent color and is free of gel constituents.

Having generally described this invention, a further understanding can be obtained by reference to certain specific examples which are provided herein for purposes of illustration only and are not intended to be limiting unless otherwise specified.

EXAMPLES

Example 1

In a continuous plant (see FIG. 1) comprising the components:

| | |
|---|---|
| 1 | a plunger pump each for laurolactam and water, |
| 2 | a circulation reactor having a total volume of 17 l and fitted with circulating pump, |
| 3 | a tube reactor having an internal diameter of 100 mm and a total length of 27 m, with parcels of static mixers being built in 6 m apart, |
| 4 | a pressure holding valve, |
| 5a | a depressurization vessel having a volume of 150 l and fitted with a pressure-regulated depressurization unit, |
| 6a | a gear discharge pump and |
| 7 | a discharge unit for extrusion, cooling and granulation, | polyamide 12 was prepared according to the invention under the following conditions:

| | |
|---|---|
| Wall temperature in plant items 2 to 6a: | 290° C. |
| Wall temperature in plant item 7: | 270° C. |
| Pressure in plant items 2 to 4: | 80 bar |
| Pressure in plant item 5a: | 1.5 bar |
| mean residence time in plant item 5a: | 2 h |
| Mass flow of laurolactam: | 42 kg/h |
| Mass flow of water: | 8 kg/h |

The product obtained had a light color and possesses a molecular weight (number average from terminal group determination) of 14,500. The residual content of laurolactam was less than 0.3%. The product was free of gel constituents.

Example 2

Example 1 was repeated, except that the circulation reactor was omitted. The product properties remain unchanged, only the residual monomer content rose to 0.5%.

Example 3

Example 1 was repeated, but with an amount of hypophosphorous acid ($H_3PO_2$) being added to the water fed in such a way that the total amount, based on laurolactam fed in, was 60 ppm.

A high-quality product corresponding to that of Example 1 was obtained, but the molecular weight was 19,400.

Example 4

In addition to the depressurization vessel 5a as described in Example 1, a further depressurization 5b and also an additional gear discharge pump 6b were used, as shown in FIG. 1.

The process parameters were:

| | |
|---|---|
| Pressure in plant item 5a: | 2.0 bar |
| Pressure in plant item 5b: | 0.5 bar |
| Mean residence time in plant item 5b: | 2 h |

Otherwise, the parameters corresponded to those in Example 1. The product obtained has a light color and was free of gel constituents. The residual content of laurolactam was less than 0.3%. The molecular weight was 18,700.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A process for the continuous hydrolytic polymerization of laurolactam, comprising:
   (a) metering a melt of laurolactam and water via a pump to form a mixture;
   (b) reacting the mixture in a loop reactor having backmixing, to form a prepolymer;
   (c) subsequently reacting the mixture in a tube reactor to form a prepolymer;
   (d) depressurizing the mixture via a depressurization valve into a degassing apparatus, degassing the mixture; and
   (e) discharging polyamide 12; wherein:
      (i) the prepolymer has a water content of from 7 to 20% by weight,
      (ii) the reaction temperature of the prepolymer is maintained at from 280° to 320° C., and
      (iii) the depressurization valve is regulated in such a way that the working pressure is above the partial pressure of water vapor of the reaction mixture.

2. The process according to claim 1, wherein the reactor having largely ideal backmixing is a loop reactor.

3. The process according to claim 1, wherein the degassing apparatus is a flash vessel.

4. The process according to claim 3, wherein in the inflow region of the flash vessel, the melt is passed as a film over the internal wall of a heated vertical tube.

5. The process according to claim 1, wherein the mean residence time of the mixture in the tube reactor is from 0.5 to 6 hours.

6. The process according to claim 5, wherein the mean residence time of the mixture in the tube reactor is from 1.5 to 4 hours.

7. The process according to claim 1, wherein the tube reactor is completely or partially fitted with static mixer elements.

8. The process according to claim 3, wherein the mean residence time of the melt in the flash vessel is from 1 to 3 hours.

9. The process according to claim 1, further comprising further degassing the mixture after the first degassing and prior to discharging.

10. The process according to claim 9, wherein a flash vessel or a degassing screw machine is used in the second degassing step.

11. The process according to claim 1, wherein additives are fed in at any step of the process.

12. The process according to claim 1, wherein said pump is selected from the group consisting of plunger pumps and piston diaphragm pumps.

13. The process according to claim 2, wherein said loop reactor contains a pump which circulates the mixture fed thereinto at from 10 to 100 times the flow rate of the feed stream.

* * * * *